Sept. 27, 1955  R. VESTRE  2,718,759
PUMP AND MOTOR HYDRAULIC SYSTEM AND
CONTROL VALVE MEANS THEREFOR
Filed June 17, 1953  2 Sheets-Sheet 1

INVENTOR.
RASMUS VESTRE.
BY
Richards & Geier though # United States Patent Office 2,718,759
Patented Sept. 27, 1955

2,718,759
PUMP AND MOTOR HYDRAULIC SYSTEM AND CONTROL VALVE MEANS THEREFOR

Rasmus Vestre, Oslo, Norway, assignor to Hydraulik A/S, Oslo, Norway, a corporation of Norway Application June 17, 1953, Serial No. 362,339

2 Claims. (Cl. 60—53)

The invention relates to a distribution valve used for the purpose of regulating the energy which is delivered to a hydraulic motor, connected in a fluid circuit in series with a hydraulic pump, said pump operated by a driving motor.

The present application is a continuation-in-part of my co-pending patent application, Ser. No. 664,950, filed April 25, 1946, now Patent No. 2,655,000, issued October 13, 1953.

The invention relates to an arrangement using known types of distribution valves which are combined with circulation, throttling and reversing valves. With certain types of such distribution valves, the slide and the conduits in the valve housing may be so formed and arranged that in one position of the slide there is circulation between two connection pipes between the pump and the valve, so that the driving fluid flows freely from the pressure pipe of the pump through the valve to the return pipe of the pump.

Furthermore, said known distribution valves may be so arranged that the slide in at least one position stops the fluid flow between the pressure and return pipes so that the whole driving fluid must pass through the hydraulic motor in such manner that it runs at its maximum speed. The speed of the hydraulic motor can be varied by adjusting the slide in intermediate positions whereby a greater or lesser part of the driving fluid is throttled through the valve, instead of passing through the hydraulic motor.

When, for example, the hydraulic system is used for rudder control on board a ship, it may be necessary that the hydraulic motor and rudder be locked in a certain adjusted position and thus held against unwanted movement in either direction, or, if the motor drives a winch it may happen that the winch has to keep the load at rest, and it is thus a further object of the invention to prevent the hydraulic motor being retracted or reversed against the hoisting direction of the load, as more fully described in my said Patent No. 2,655,000.

In accordance with my invention, these objects are attained by the provision of one or more stop valves in the pipe or pipes, respectively, between the control valve and the hydraulic motor, so arranged and fitted that each one independently prevents a flow of fluid in the direction from the hydraulic motor in the corresponding pipe if the distribution valve is adjusted for the stoppage of the hydraulic motor by the flow of the driving fluid and to check the hydraulic motor against unexpected reversing (or retraction) in case the hydraulic motor should not supply the hydraulic motor with driving fluid with sufficient pressure or the system should become temporarily overloaded, as more fully described in my Patent No. 2,655,000.

A primary feature of this invention is that the pipes between the distribution valve and the hydraulic motor are divided in two conduits. In one of said conduits, a check valve is provided which opens against the motor and closes in the opposite direction, the slider having a land/or sealing piston at opposite ends, said land being wider than the said conduit without check-valve, so as to close this or both such conduits, there being a by-pass passage in the valve housing, the land upon the slider being adapted to wholly or partly close an entrance to said by-pass.

A preferred embodiment of the invention is shown on the accompanying drawings, wherein.

Figure 1:
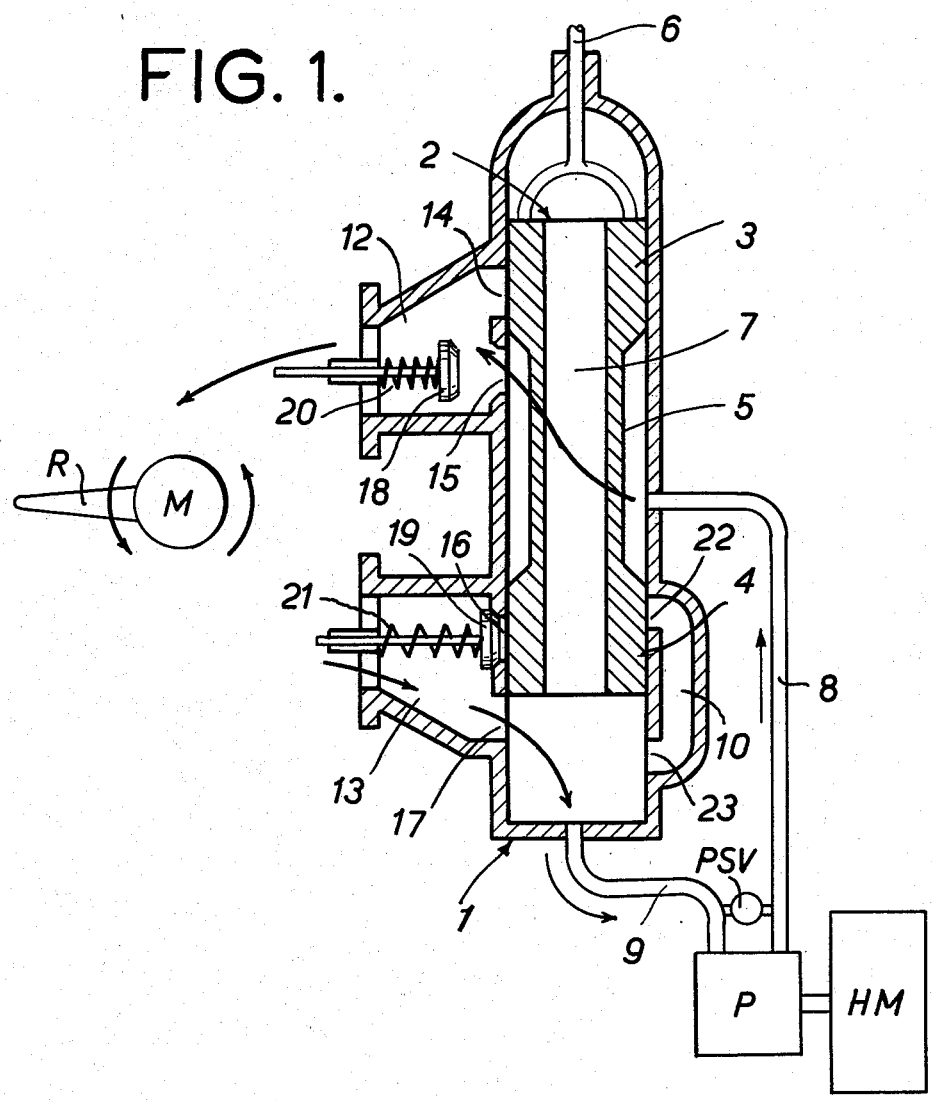
Figure 1 is a diagrammatic view of the distribution valve in longitudinal section having two check valves arranged one in each of the pipes between the distribution valve and the hydraulic motor, the slider being adjusted to a position for driving the motor at full speed in one determined direction; which figure also shows the hydraulic pump and its driving motor.

Figure 1 of the drawing shows the hydraulic pump P which is continuously driven in one direction by an engine HM and which delivers a constant unidirectional quantity of fluid to the hydraulic motor M. The motor may drive a winch or any other device not shown upon the drawing, by way of example, the device being used as a rudder steering mechanism on board a ship maneuvering a rudder R.

Figures 1 to 5 show a valve housing or cylinder 1, wherein is slidably received a symmetrical slide 2 having lands or sealing pistons 3 and 4 at opposite ends and separated by a portion of reduced diameter 5. The slide may be moved by any suitable mechanism (not shown) by means of which all necessary adjustments are effected in the distribution valve. By way of example, a stem 6 is shown. The opposite ends of the cylinder communicate with each other by a central longitudinal conduit 7 through the slide. This is partly for fluid pressure compensation, so that the opposite ends of the housing, and thus also the opposite ends of the slides are always maintained under the same fluid pressure, and partly so that the fluid may flow freely between the opposite ends of the cylinder. Instead of a central passage through the slide, the same object may be attained by an external passage in the housing connecting the opposite ends of the housing, such as the pipe 5, 6 in my Patent No. 2,655,000. In such case the slide 2 is made solid.

The pressure pipe 8 from the pump P is connected approximately to the center of the cylinder 1 and the return pipe 9 is connected at one end, shown as the lower end of the cylinder. The terms "pressure pipe" and "return pipe" should be taken as functional variables. Thus, if a unidirectional pump turning in the opposite direction to the example, the pipe 9 will become the pressure pipe and the pipe 8 the return pipe. A pump safety valve PSV is interposed between the pressure pipe 8 and the return pipe 9. This safety valve is adjusted for a certain fluid pressure in the pipe 8 corresponding to the maximum load that the system in question is capable of handling. In case of overload, the pump safety valve opens or "blows" and the pressure fluid from the pipe 8 is by-passed through the pump safety valve through the return pipe 9 back to the pump.

Upon one or each side of the connection of the pressure pipe 8 into the cylinder 1 is provided a by-pass passage 10. In Figures 1, 2, 4 and 5 a single by-pass passage 10 is shown, while Figure 3 indicates how an additional passage 11 may be arranged, one on each side of the connection of the pressure pipe 8. Two such passages may be needed in cases where larger quantities of fluid pass through the system.

The connecting pipes leading to and from the hydraulic motor M are indicated by the numerals 12 and 13. In the example shown each such pipe is subdivided into two conduits 14, 15 and 16, 17, respectively. In each of the conduits 15 and 16 a non-return check valve 18 and 19, respectively, is arranged which opens only for the flow of the driving fluid in a direction to the hydraulic motor, but closes again as soon as this pressure ceases or a greater pressure is exerted from the opposite side. When fluid pressures are equal on opposite sides of such valves, they are closed against their seat by a spring 20 and 21, respectively.

Each of the lands 3 and 4 is substantially wider than the ports 14 and 17, respectively, so as to simultaneously close one of such ports and an entrance 22 to the by-pass passage 10 (or 11).

This embodiment of the invention has five main operative positions illustrated in Figures 1 to 5 of the drawings and described in the following:

(I) When the slide 2 is at its uppermost position, as shown in Figure 1, the lands 3 and 4 entirely block the ports 14 and 16, respectively, as well as the upper entrance 22 to the by-pass passage 10, while leaving the ports 15 and 17 open. The pressure fluid consequently must flow from the pump P, through the pressure pipe 8, through the central part of the cylinder 1, through the port 15, lifting the valve 18 from its seat and further through the pipe 12, through the hydraulic motor M and thereafter back to the pump through the pipe 13, to open port 17, through the lower part of the cylinder 1 and the return pipe 9, as shown by the heavy arrows. In case the return pipe 9 to the pump is connected to the upper end of the cylinder, the fluid from the port 17 flows through the central bore 7 in the slide (or if same is solid through an external passage) to such return pipe. The motor is then driven at its maximum speed in one direction, as shown by the heavy arrows, for turning the rudder R in such direction, or in case the motor M is used as a winch, to hoist a load not shown. If for some reason or other, the pump-driving motor HM should stop or become unstable or the pump P should not deliver fluid with sufficient pressure to handle the load in question, the check valve 18 will close and prevent the retraction or unwanted reversing of motor M.

Figure 2:
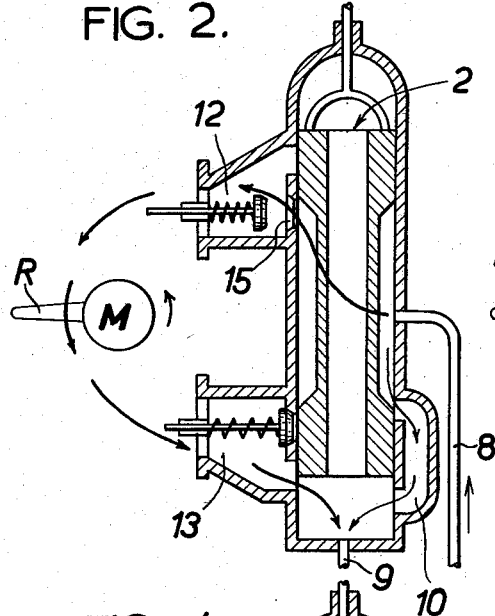
Figures 2 to 5 are diagrammatic views of this construction of the distribution valve in longitudinal section, the slider being illustrated in different positions.

(II) By adjusting the slide 2 axially to a position somewhat lower in the cylinder 1, as shown in Figure 2, the land 3 will still block the port 14, while the land 4 partially blocks or chokes the port 17. At the same time the land 4 gradually opens the upper entrance 22 to the passage 10, permitting a fluid by-pass between the pressure pipe 8, through the passage 10 to the return pipe 9. Thus, a larger or smaller part of the fluid then in Figure 1 runs in the direction of the heavy arrows in Figure 2, and a correspondingly smaller or larger part of the fluid, dependent upon the extent to which the upper part of the land 4 blocks or opens for the upper entrance 22 to the passage 10, does not pass through the hydraulic motor M, but is by-passed from the pressure pipe 8, through the passage 10 and over to the return pipe 9, as shown by the light arrows in the Figure 2. The speed of the hydraulic motor may thus be varied by throttling the by-pass passage 10 by means of the land 4 more or less between the pipes 8 and 9. In case the pump P should not deliver fluid under sufficient pressure to handle the load the check valve 18 will close against its seat and prevent unwanted reversing or retraction of motor M.

Figure 3:
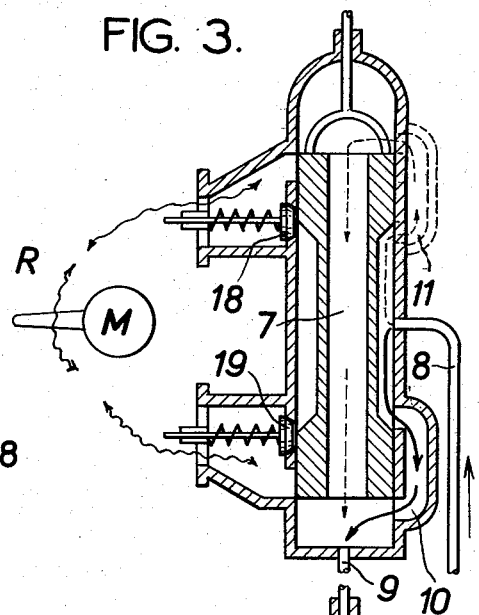

(III) By adjusting the slide 2 to its central or neutral position in the cylinder, as shown in Figure 3, the lands 3 and 4 will entirely block the ports 14 and 17, respectively, while both check-valves 18 and 19 are closed against their seats, locking the motor M against turning in either direction. In this postion of the slide, the lands 3 and 4, however, open the lower and upper entrances to the passages 11 and 10, respectively, so that the pressure fluid from the pipe 8 now flows partly through the passage 11 and the central passage 7 in the slide and partly through the passage 10, back through the return pipe 9.

In case the apparatus is used for rudder-maneuvering the rudder R is turned to the wanted angle by adjusting the slide in positions I or II, and when the rudder has reached this angle, the slide is immediately adjusted to position III, to lock the rudder in this angle for the wanted period of time.

Figure 4:
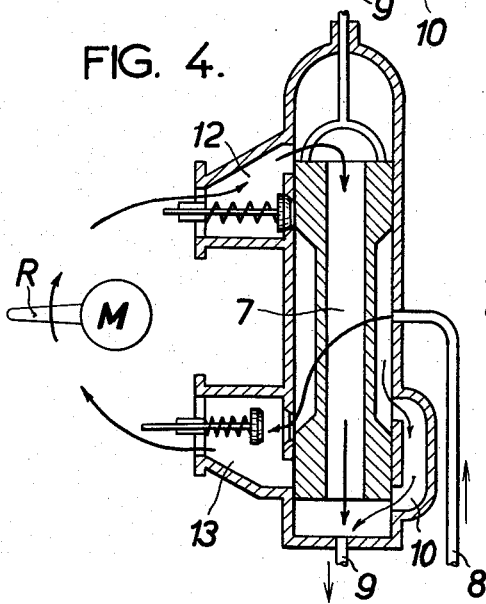

(IV) By adjusting the slide to a position somewhat lower in the cylinder, as shown in Figure 4, the land 4 will partially open the port 16, partly close the lower outlet 23 from the passage 10 and entirely block the port 17, while the land 3 will partially open the port 14 and entirely block the port 15. A part of the pressure fluid will now flow from the pipe 8, through the port 16, lift the valve 19 from its seat, through the pipe 13, the motor M, pipe 12, port 14, the central passage 7 in the slide to the return pipe 9, as shown by the heavy arrows, while the remaining part of the pressure fluid will be by-passed from the pipe 8 through the passage 10 over to the return pipe 9, as shown by the light arrows. This position of the slider corresponds to the position shown in Figure 2 and described under II in the above, but the motor is, of course, driven in the opposite direction thereof, the speed of the motor being controlled by choking a greater or larger part of the pressure fluid through the by-pass 10, as shown by the light arrows.

Figure 5:
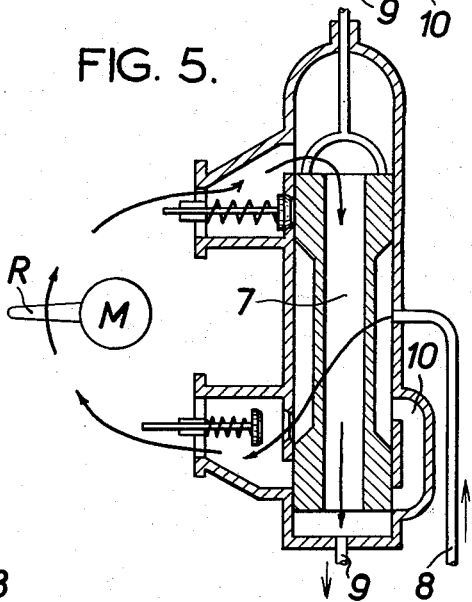

(V) By adjusting the slide to its extreme lower position, as shown in Figure 5, the lands 3 and 4 will entirely block the ports 15 and 17, respectively, as well as the passage 10, so that the motor M is driven at its maximum speed in the opposite direction to that shown in Figure 1, and as indicated by the arrows in Figure 5. This position corresponds to position I and shown in Figure 1, but the motor is, of course, driven in the opposite direction thereof.

The above disclosure has been given by way of illustration and elucidation, and it is desired to protect all embodiments of the herein disclosed inventive concept within the scope of the appended claims.

What is claimed is:

1. In a hydraulic transmission having a motor and a constantly running pump actuating the motor by a hydraulic fluid; a valve for controlling the flow of the fluid from the pump to the motor, the valve comprising a housing, the housing having a longitudinal bore with closed ends formed therein and further having a central and an end opening and two additional spaced openings formed therein, the central opening being intermediate the two additional openings; a pipe line connecting the central opening with the pressure side of the pump, a second pipe line connecting the end opening with the suction side of the pump, a third pipe line connecting one of the additional openings with one side of the motor, and a fourth pipe line connecting the other additional opening to the opposite side of the motor; the housing further having a by-pass for the hydraulic fluid, the by-pass extending between a point adjacent one of the closed ends of the longitudinal bore of the housing and a point adjacent to the central opening; a slide displaceable in the longitudinal bore, the slide having a portion of reduced diameter intermediate the ends and positioned to span and connect the central opening with the closest of the two additional spaced openings in the operating position of the motor, and check valve means positioned to permit the flow of fluid only in the direction of the motor when the valve is set for the operating position thereof.

2. In a hydraulic transmission having a motor and a constantly running pump actuating the motor by a hydraulic fluid according to claim 1 in which the housing is characterized by having check valve means in each of the two additional openings, the check valves being operable to permit the flow of fluid only in the direction of the motor when the valve is set for the operating position thereof.

References Cited in the file of this patent

UNITED STATES PATENTS

| | | |
|---|---|---|
| 695,061 | Lang | Mar. 11, 1902 |
| 1,775,856 | Hauser | Sept. 16, 1930 |
| 1,955,154 | Temple | Apr. 17, 1934 |
| 2,359,802 | Stephens | Oct. 10, 1944 |
| 2,387,307 | Stone | Oct. 23, 1945 |
| 2,482,249 | Court | Sept. 20, 1949 |
| 2,655,000 | Vestre | Oct. 13, 1953 |